United States Patent
Yu

(10) Patent No.: US 9,088,138 B2
(45) Date of Patent: Jul. 21, 2015

(54) MOUNTING DEVICE FOR SECURING ELECTRONIC COMPONENT

(75) Inventor: Wen-Hua Yu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 180 days.

(21) Appl. No.: 13/539,697

(22) Filed: Jul. 2, 2012

(65) Prior Publication Data
US 2013/0214109 A1 Aug. 22, 2013

(30) Foreign Application Priority Data
Feb. 16, 2012 (CN) .......................... 2012 1 0034947

(51) Int. Cl.
*H02B 1/052* (2006.01)
*H01R 9/26* (2006.01)

(52) U.S. Cl.
CPC ............ *H02B 1/0526* (2013.01); *H01R 9/2608* (2013.01); *H02B 1/052* (2013.01); *H02B 1/0523* (2013.01)

(58) Field of Classification Search
CPC .... H02B 1/052; H02B 1/0526; H02B 1/0523; H01R 9/2608
USPC ................. 248/298.1, 229.26, 229.22, 227.2, 248/227.4, 231.41, 231.81, 229.12, 229.16; 439/532
See application file for complete search history.

(56) References Cited

U.S. PATENT DOCUMENTS

| | | | | |
|---|---|---|---|---|
| 4,067,529 A * | 1/1978 | Milcoy | .................... | 248/222.12 |
| 4,921,445 A * | 5/1990 | Herbert | ......................... | 439/532 |
| 5,598,322 A * | 1/1997 | Von Arx et al. | ............... | 361/704 |
| 5,904,592 A * | 5/1999 | Baran et al. | ..................... | 439/532 |
| 6,120,000 A * | 9/2000 | Aeschbach et al. | ........... | 248/694 |
| 6,371,435 B1 * | 4/2002 | Landis et al. | .................. | 248/694 |
| 6,563,697 B1 * | 5/2003 | Simbeck et al. | ............. | 361/668 |
| 6,563,710 B1 * | 5/2003 | Okuda et al. | ................... | 361/704 |
| 7,059,898 B2 * | 6/2006 | Barile | ........................... | 439/532 |
| 7,374,453 B1 * | 5/2008 | Allcock et al. | ................ | 439/532 |
| 7,522,428 B2 * | 4/2009 | Nguyen | ........................ | 361/803 |
| 7,758,368 B2 * | 7/2010 | Schelonka et al. | ............ | 439/325 |

(Continued)

FOREIGN PATENT DOCUMENTS

| DE | 9103971 U1 * | 6/1991 |
|---|---|---|
| DE | 29506579 U1 * | 6/1995 |

(Continued)

*Primary Examiner* — Terrell McKinnon
*Assistant Examiner* — Eret McNichols
(74) *Attorney, Agent, or Firm* — Novak Druce Connolly Bove + Quigg LLP

(57) ABSTRACT

A mounting device for securing an electronic component includes a support base, a fixing board and a latching member. The support base includes a first track defining a first sliding direction and a second track defining a second sliding direction that intersects with the first sliding direction. The fixing board is connected to the electronic component and capable of sliding along the first track with the electronic component. The latching member is capable of sliding along the second track and includes an elastic element. The elastic element is configured to position the latching member at a desired position with respect to the support base and to provide a resilient force to the latching member, allowing the latching member to push the fixing board to cause the fixing board to abut against the support base, thereby limiting a movement of the fixing board along the first track.

3 Claims, 4 Drawing Sheets

(56) References Cited

U.S. PATENT DOCUMENTS

| | | | |
|---|---|---|---|
| 7,980,891 B2 * | 7/2011 | Molnar | 439/532 |
| 8,003,899 B2 * | 8/2011 | WenLong et al. | 174/561 |
| 8,062,061 B2 * | 11/2011 | Lim et al. | 439/532 |
| 8,066,239 B2 * | 11/2011 | Molnar et al. | 248/214 |
| 8,226,433 B1 * | 7/2012 | Correll et al. | 439/532 |
| 8,651,442 B2 * | 2/2014 | Takaya et al. | 248/225.21 |
| 2008/0299820 A1 * | 12/2008 | Schelonka et al. | 439/532 |
| 2010/0128448 A1 * | 5/2010 | WenLong et al. | 361/747 |
| 2010/0314522 A1 * | 12/2010 | Molnar et al. | 248/346.06 |
| 2014/0139976 A1 * | 5/2014 | Santoni et al. | 361/605 |
| 2014/0226287 A1 * | 8/2014 | V et al. | 361/747 |

FOREIGN PATENT DOCUMENTS

| | | | | |
|---|---|---|---|---|
| EP | 1833132 A1 | * | 9/2007 | H02B 1/052 |
| EP | 2582000 A1 | * | 4/2013 | |
| JP | 2007189102 A | * | 7/2007 | |
| JP | 4844911 B1 | * | 12/2011 | |

* cited by examiner

MOUNTING DEVICE FOR SECURING ELECTRONIC COMPONENT

BACKGROUND

1. Technical Field

The present disclosure relates to mounting devices, and particularly, to a mounting device for securing an electronic component.

2. Description of Related Art

Many electronic components, such as switches, electricity meters, and breakers, are usually mounted to a support base via a mounting rail. Typically, the mounting rail includes a latching member for firmly securing the mounting rail on the support base. Although this type of latching member is somewhat useful, its complicated structure makes it cumbersome and time consuming to assemble the electronic component to or remove the electronic component from the support base.

Therefore, what is needed is a new mounting device to solve the problems described above.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
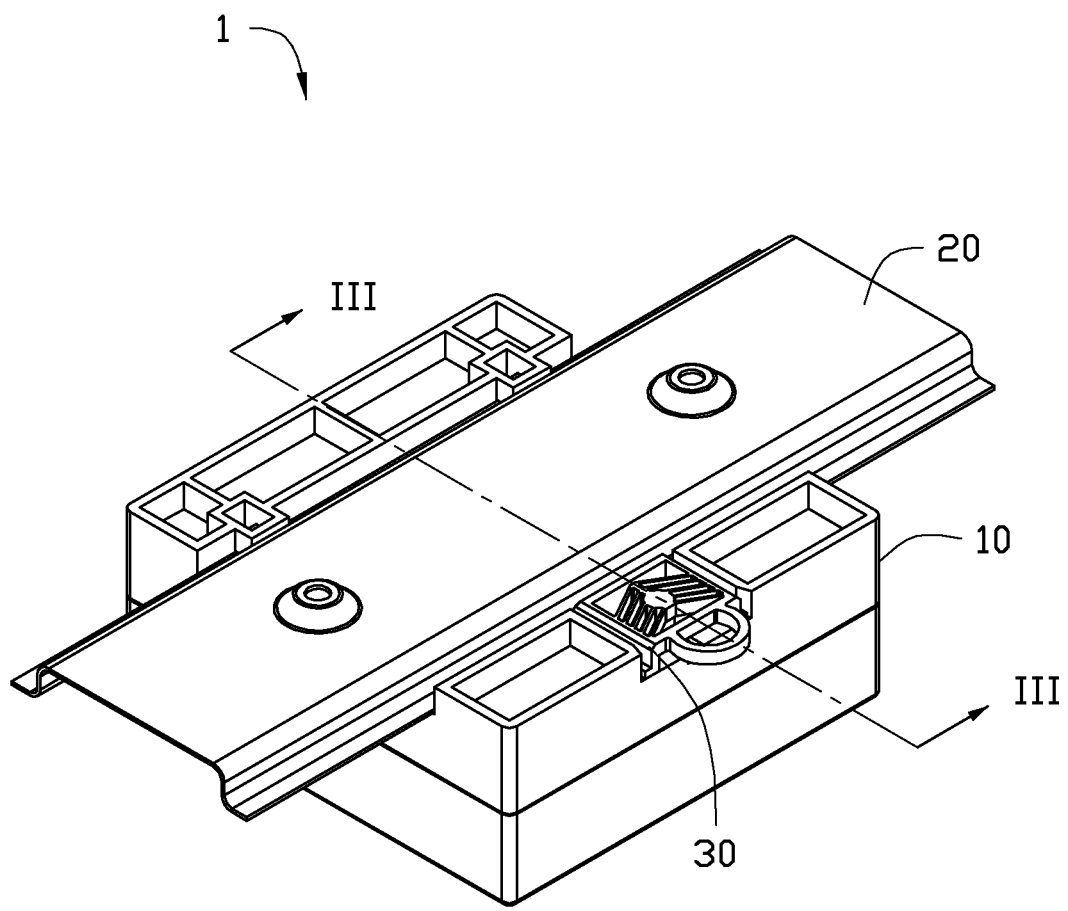
FIG. 1 is an isometric view of a mounting device for securing an electronic device, in accordance with an exemplary embodiment.

FIG. 1 is an exemplary embodiment of a mounting device 1 for securing an electronic component (not shown). The electronic component can be a switch, an electronic meter, a breaker, or the like. The mounting device 1 includes a support base 10; a fixing board 20, connected to the electronic component and capable of sliding with respect to the support base 10; and a latching member 30, to secure the fixing board 20 to the support base 10. In an embodiment, the support base 10 includes a first track defining a first sliding direction and a second track defining a second sliding direction that intersects with the first sliding direction. In an embodiment, the second track is perpendicular to the first track. The fixing board 20 and the latching member 30 can respectively slide along the first and the second tracks. The fixing board 20 defines a number of internally-threaded holes 200, such that the electronic component can be secured to the fixing board 20 by screws and can slide with the fixing board 20.

Figure 2:
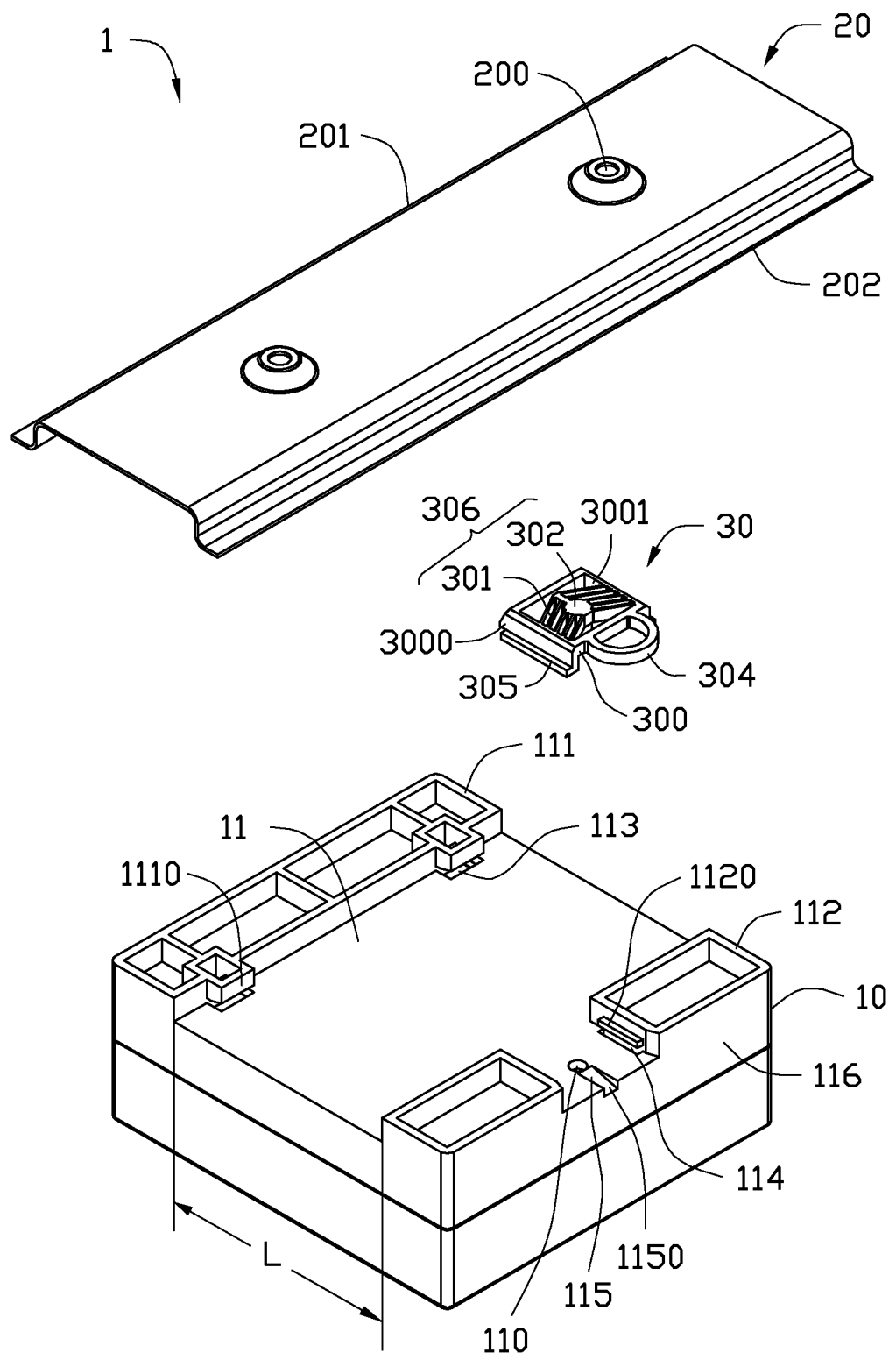
FIG. 2 is a disassembled isometric view of the mounting device of FIG. 1.

Referring to FIG. 2, in an embodiment, the support base 10 includes a top surface 11 and a bottom surface opposite to the top surface 11. The bottom surface includes a fixing member (not shown), such as a double-sided adhesive for example, thereby allowing the support base 10 to be attached to a flat surface (e.g., a wall surface).

A first guide portion 111 and two second guide portions 112 are formed on the top surface 11. The two second guide portions 112 are arranged at the same side of the first guide portion 111, parallel to the first guide portion 111, and spaced from the first guide portion 111 by a set distance (labeled as L).

The fixing board 20 includes a first edge 201 and a second edge 202 opposite to the first edge 201. In an embodiment, the distance between the first and the second edges 201, 202 (namely the lateral size of the fixing board 20) is equal to the distance L between the first and the second guide portions 111, 112. The first and the second guide portions 111, 112 cooperatively form the first track. The fixing board 20 is capable of sliding on the top surface 11 along the first track.

In an embodiment, at least one first projection 1110 protrudes from the first guide portion 111 toward the second guide portions 112. The first projection 1110 is located above the top surface 11, such that the first projection 1110 and the top surface 11 cooperatively form a first guiding groove 113. The first guiding groove 113 receives the first edge 201 of the fixing board 20.

The two second guide portions 112 are spaced from each other to cooperatively form the second track. The latching member 30 is capable of sliding on the top surface 11 along the second track. In an embodiment, each of the second guide portions 112 includes a second projection 1120, and the two second projections 1120 are facing each other. Each second projection 1120 is located above the top surface 11, such that the second projections 1120 and the top surface 11 cooperatively form two second guiding grooves 114.

Figure 3:
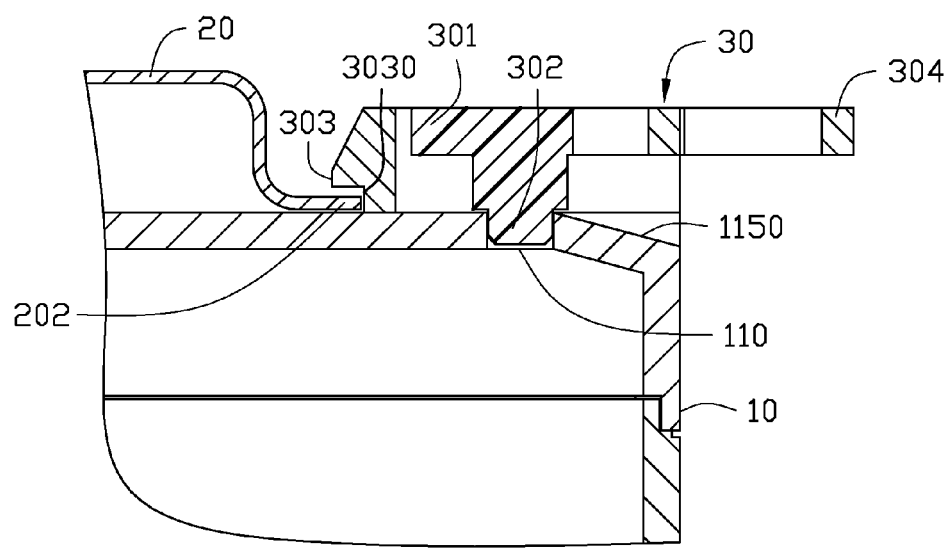
FIG. 3 is a cut-across view of the mounting device of FIG. 1 along line III-III.

Referring to FIG. 3, the latching member 30 includes a main body 300. The main body 300 is substantially hollow and rectangular, and includes two side surfaces 3000 opposite to each other. Each side surface 3000 includes a flange 305 protruding perpendicularly from its distal end and away from each other. The two flanges 305 are received in the second guiding grooves 114, which can prevent the latching member 30 from disengaging from the support base 10 when the latching member 30 is sliding along the second track.

The latching member 30 further includes an elastic element 306 made of elastic material, such as rubber for example. The elastic element 306 is configured for positioning the latching member 30, and further providing a resilient force to the latching member 30 to allow the latching member 30 to push the fixing board 20 along the second track. The fixing board 20 can abut firmly against the support base 10 and the movement of the fixing board 20 along the first track is limited by the latching member 30.

In an embodiment, the elastic element 306 includes a number of ribs 301 and a positioning post 302 connected to the ribs 301. Each rib 301 has two ends respectively connected to the interior sidewalls 3001 of the side surfaces 3000. In this case, a fixing hole 110 and a sliding slot 115 adjacent to the fixing hole 110 are defined in the top surface 11 and between the two second guide portions 112. The support base 10 further includes a sidewall 116, and the distance between the sliding slot 115 and the sidewall 116 is less than that between the fixing hole 110 and the sidewall 116. The sliding slot 115 includes an inclined surface 1150 inclined from the top surface 11 and running downwardly through the sidewall 116.

In assembly, a user can push the latching member 30 to allow the latching member 30 to slide toward the first guide portion 111, and then the positioning post 302 is guided along the inclined surface 1150 of the sliding slot 115 until the positioning post 302 is inserted into the fixing hole 110. The positioning post 302 is slightly wider than the fixing hole 110, and is tightly fitted within the fixing hole 110. The latching member 30 is thus held in position. In an embodiment, a front portion of the main body 300 further defines a latching groove 303 with a vertical portion 3030. When the latching member 30 is held in position, the space between the vertical portion 3030 and the first guide portion 111 is less than that between the first and the second guide portions 111, 112 (labeled as L as described above, namely the lateral size of the fixing board 20).

When the user pulls the latching member 30 away from the first guide portion 111, and because the positioning post 302 is tightly fit in the fixing hole 110, the positioning post 302 is elastically deformed, and the ribs 301 are elastically deformed with the positioning post 302. When the pulling of the latching member 30 is stopped, the ribs 301 and the positioning post 302 rebound and push the latching member 30 to move back until the vertical portion 3030 contacts the second edge 202 of the fixing board 20. Since the vertical portion 3030 is spaced from the first guide portion 111 by a distance L larger than that when the latching member 30 is located at its original position, the ribs 301 and the positioning posts 302 are still in an elastically deformed state when the vertical portion 3030 contacts the second edge 202 of the fixing board 20. Thus, the fixing board 20 can abut firmly against the support base 10 because the remaining resilient force of the ribs 301 and the positioning post 302 pushes the second edge 202 via the vertical portion 3030. In an alternative embodiment, the latching groove 303 may be omitted from the main body 300. In this case, optionally, the vertical portion 3030 may be replaced by the front portion of the latching member 30, then the latching member 30 directly pushes the fixing board 20 via its front portion.

In disassembly, the user needs to pull the latching member 30 to cause the latching member 30 to stop applying the resilient force to the fixing board 20. In an embodiment, the main body 300 further includes a ring 304, opposite to the latching groove 303, and the user can exert the pulling force on the latching member 30 via the ring 304.

Figure 4:
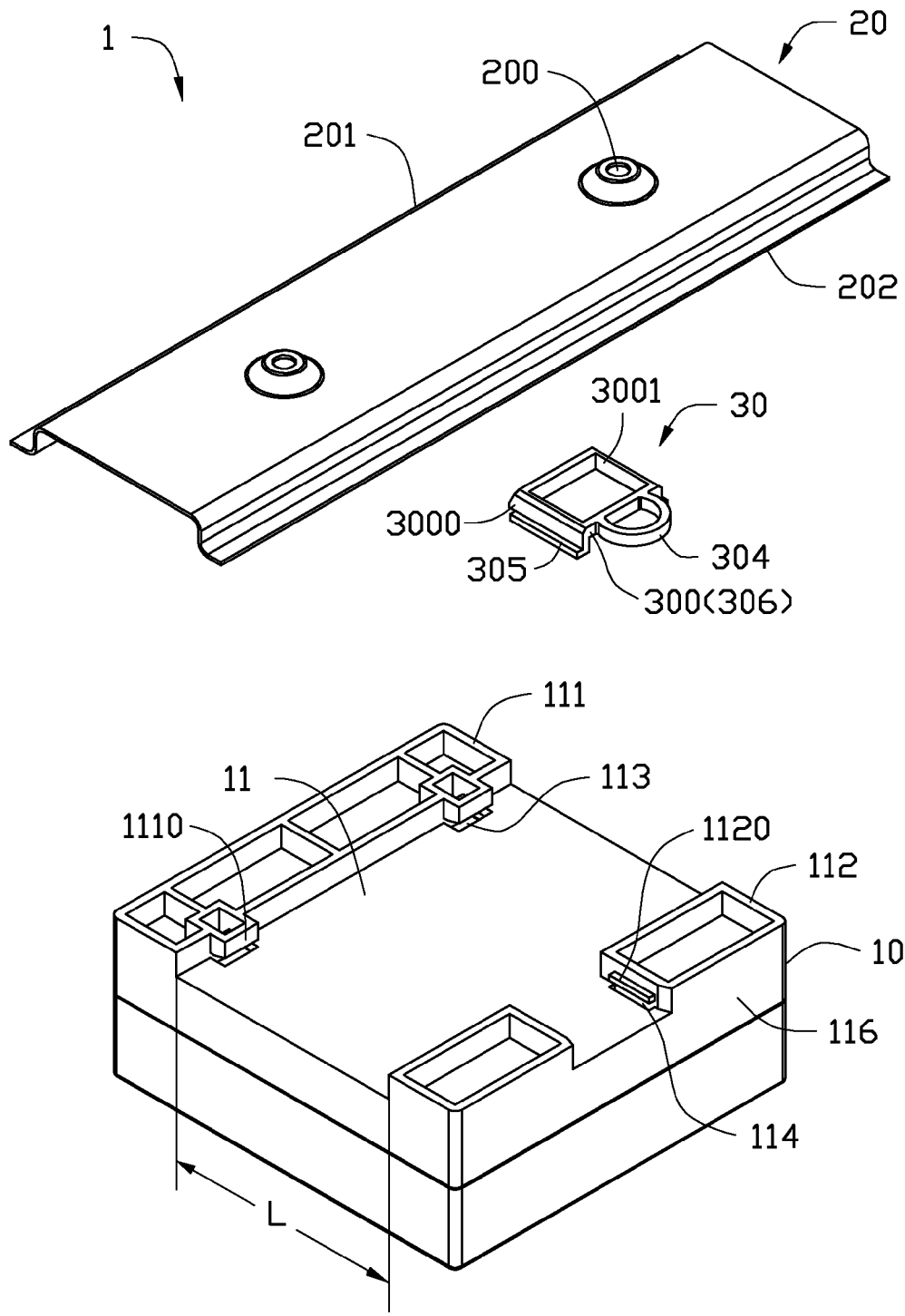
FIG. 4 is a disassembled isometric view of a mounting device, in accordance with another exemplary embodiment.

Referring to FIG. 4, in yet another alternative embodiment, the ribs 301 and the positioning post 302 may be omitted from the latching member 30, and the top surface 11 need not to define the fixing hole 110 and the sliding slot 115. Instead, the main body 300 is made of elastic material and functions as the elastic element 306 as mentioned above. The space between the two side surfaces 3000 is slightly greater than that between the two second guide portions 112, in this case, the main body 300 is elastic deformed when sliding along the second guide portions 112, thus the main body 300 can provide a resilient force to retain the latching member 30 at the second track. Therefore, when assembly, the user can push the fixing board 20 to slide along the first track until a desired position. Then the user can further push the latching member 30 to slide toward the fixing board 20 until the vertical portion 3030 is in tight contact with the second edge 202 of the fixing board 20. Since the latching member 30 is in an elastically deformed state when sliding along the second guide portions 112, the latching member 30 can retain at the second track under the resilient force such that the vertical portion 3030 can keep pressing the fixing board 20 against the support base 10.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A mounting device for securing an electronic component, comprising:
 a support base comprising:
  a first track defining a first sliding direction; and
  a second track defining a second sliding direction that intersects with the first sliding direction;
 a fixing board for being connected to the electronic component and capable of sliding along the first track with the electronic component; and
 a latching member capable of sliding along the second track and comprising an elastic element; the elastic element being configured to position the latching member at a desired position with respect to the support base, and to provide a resilient force to the latching member, allowing the latching member to push the fixing board to cause the fixing board to abut against the support base, thereby limiting a movement of the fixing board along the first track;
 wherein the support base comprises a top surface; a first guide portion and two second guide portions are formed on the top surface; the two second guide portions are arranged at a same side of the first guide portion, parallel to the first guide portion, and spaced from the first guide portion by a set distance; the first and the second guide portions cooperatively form the first track; and the two second guide portions cooperatively form the second track;
 wherein each of the two second guide portions comprises a second projection facing each other; each second projection is located above the top surface, such that the two second projections and the top surface cooperatively form two second guiding grooves; the latching member comprises a main body; the main body comprises two side surfaces opposite to each other; each side surface comprises a flange protruding perpendicularly from the distal end and away from each other; and the two flanges are received in the second guiding grooves; and
 wherein the elastic element comprises a plurality of ribs connected between the side surfaces and a positioning post connected to the ribs; the top surface further defines a fixing hole and a sliding slot adjacent to the fixing hole between two second guide portions, the sliding slot comprises an inclined surface inclined from the top surface and running downwardly through a sidewall of a support base; the positioning post is guided along the inclined surface until the positioning post is inserted into the fixing hole; and the positioning post is slightly wider than the fixing hole and is tightly fitted within the fixing hole, which holds the latching member in position.

2. The mounting device of claim 1, wherein the main body further comprises a vertical portion, and the resilient force pushes the fixing board along the second track via the vertical portion, thereby allowing the fixing board to abut against the support base.

3. The mounting device of claim 2, wherein the main body further comprises a ring that is opposite to the vertical portion.

* * * * *